United States Patent

[11] 3,545,620

| | | | |
|---|---|---|---|
| [72] | Inventor | Ewald R. Thorn Rucherhausen, Germany | |
| [21] | Appl. No. | 882,434 | |
| [22] | Filed | Dec. 5, 1969 | |
| [45] | Patented | Dec. 8, 1970 | |
| [73] | Assignee | Passavant-Werke Michelbaches Hutte, Germany | |
| [32] | Priority | Dec. 13, 1968 | |
| [33] | | Germany | |
| [31] | | No. 1,814,631 | |

[54] WASTE WATER TREATMENT PLANT
18 Claims, 4 Drawing Figs.

[52] U.S. Cl. .................................................. 210/208, 210/520, 210/525, 210/526
[51] Int. Cl. ....................................................... B01d 21/12, B01d 21/16
[50] Field of Search ............................................ 210/208, 520, 525, 526, 194, 197

[56] References Cited
UNITED STATES PATENTS
2,635,758  4/1953  Walker..................... 210/526X

*Primary Examiner*—J. L. Decesare
*Attorney*—Larson and Taylor

ABSTRACT: A waste water treatment plant comprising a central mixing chamber surrounded by a flocculation reaction chamber, both chambers located in a rectangular sedimentation basin for both flocculating and settling solid pollutants from waste water. The basin is rectangular with the chambers preferably located in the longitudinal center thereof, the two ends of the basin constituting a sedimentation zone. The chambers may be mounted on a beam extending across the basin. The reaction chambers may extend for the full transverse width of the basin. A chain scraper may be provided on the bottom of the basin to move settled sludge to a sludge sump. An adjustable scum remover is provided above the sedimentation zone.

PATENTED DEC 8 1970
3,545,620
INVENTOR
EWALD R. THORN
BY Larson and Taylor
ATTORNEYS
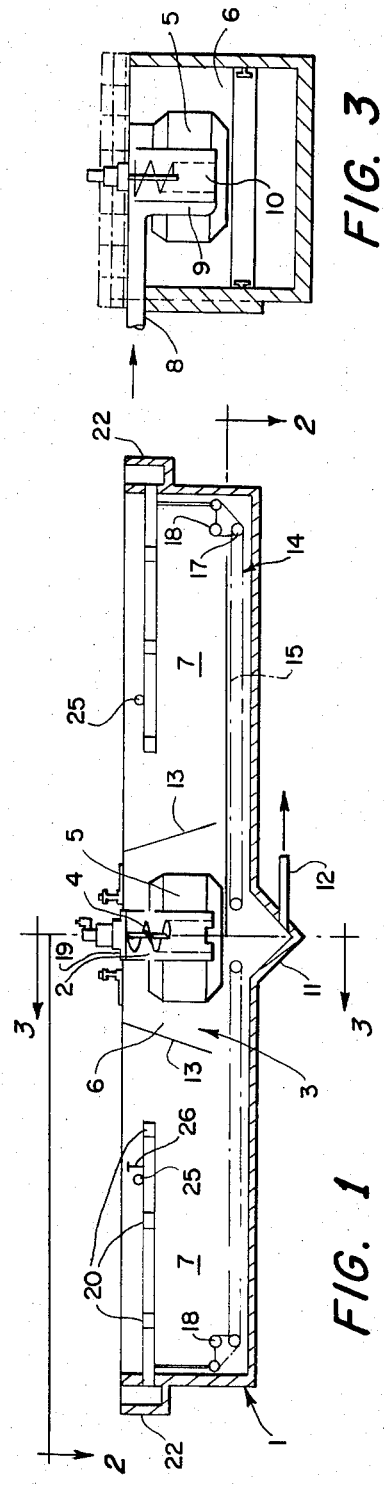
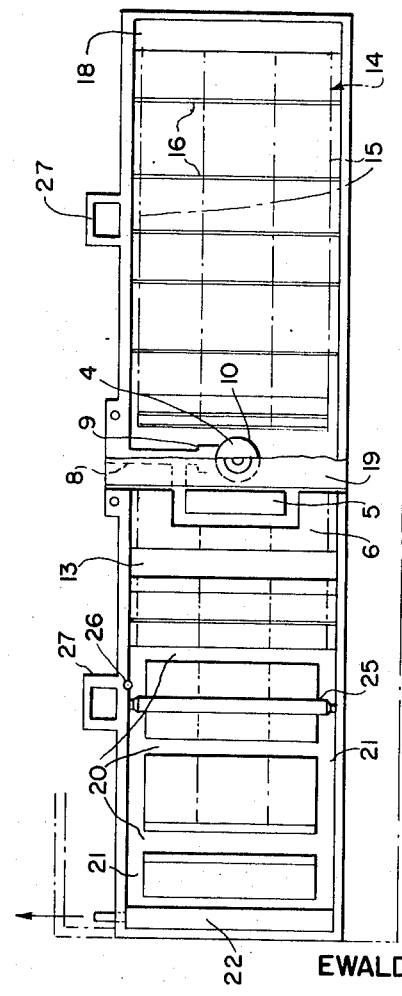
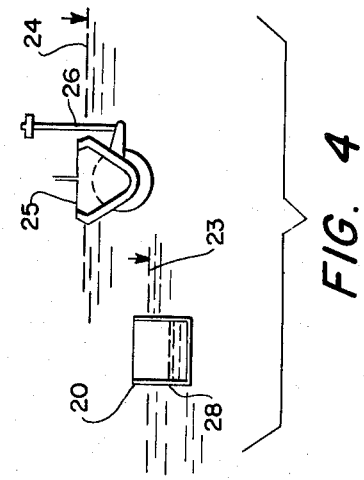

WASTE WATER TREATMENT PLANT

BACKGROUND OF THE INVENTION

This invention relates to waste water treatment, and in particular it relates to a waste water treatment plant of the type wherein both flocculation and sedimentation of solid materials within the waste water are carried out.

The process of separating finely distributed mineral and organic solid materials from the waste water is normally carried out by first encouraging flocculation of the suspended particles by a controlled slight agitation or the like, thereby causing the particles to aggregate into larger flocs which could then be removed in a sedimentation tank. To encourage flocculation of the suspended particles, a controlled but slightly agitated condition is required. On the other hand, a relatively calm poollike condition is most conducive for sedimentation. Therefore, historically it has been customary to carry out each of these procedures in different pieces of equipment. Many devices have been suggested for carrying out both of these operations in a single piece of equipment. However, most of the previously developed pieces of equipment for carrying out both flocculation and sedimentation have suffered from numerous disadvantages.

However, in the previous application Ser. No. 638,113, filed May 12, 1967, and now U.S. Pat. No. 3,487,017, issued Dec. 30, 1969, of common ownership with the present application, a water treatment plant is disclosed and claimed in which it is possible to successfully and efficiently carry out both flocculation and sedimentation in a single piece of equipment without the disadvantages of previous devices. The present invention represents an improvement of that said previous patent.

In the invention of the said previous patent, raw sewerage, crude waste water or the like is introduced into the bottom of a central generally circular mixing chamber from which the raw sewerage is raised gently by a spiral conveyor towards the top of the mixing chamber. The slight agitation caused by the conveyor encourages flocculation while concurrently resisting damage to already formed flocs. At the top of the mixing chamber the liquid flows outwardly therefrom into a surrounding flocculation reaction chamber including an inner concentric flocculation chamber and an outer concentric flocculation chamber. Substantially all of the floc-containing liquid in the inner reaction chamber is directed back into the bottom of the mixing chamber together with a small percentage from the outer reaction chamber. This liquid entering the bottom of the mixing chamber, having already passed through the mixing chamber once before, contains some floc accumulations which, upon being combined with fresh waste water influent, encourage more and larger flocculations in the mixing chamber. Chemicals which may have been originally added in the mixing chamber to induce the flocculation are also recycled. Meanwhile, the floc containing liquid in the outer reaction chamber is directed into a sedimentation zone which surround the reaction chamber in which, owing to the relatively calm conditions in the sedimentation zone, the relatively large floc accumulations received from the outer reaction chamber are not disturbed or broken up but instead, except for a very small portion which may be redirected back to the mixing chamber, are settled out. Suitable sludge scraping devices are provided for scraping sludge from the bottom of the sedimentation zone. Also, means are provided for removing from the upper portion of the sedimentation zone both clarified water and floating surface scum.

The invention of the said previous patent represents a considerable improvement over the prior art known before that time. However, until now such plants have been designed as circular buildings or circular basins only wherein the individual mixing chambers, reaction chambers and sedimentation zones were concentrically arranged relative to each other. The reason for this arrangement was the opinion of experts in the field that only in this manner could a uniform flow through the individual zones be provided with corresponding optimum flocculation and sludge sedimentation. Such circular basins were considered essential even in circumstances where a circular basin resulted in a very poor utilization of available space.

Thus, there exists a need for providing an improvement of the said previous patent which will permit reshaping of the same so that the invention of the said previous patent can be carried out without a concurrent increase in overall costs because of poor space utilization.

SUMMARY OF THE INVENTION

Thus, it is a purpose of this invention to provide a new and improved water treatment plant in which both flocculation and sedimentation may be carried out, which plant overcomes disadvantages of the presently known arrangements.

As a basic feature of the present invention, it has now been found that the advantages of known treatment plants, namely positive floc formation in a minimal treatment time do not require the use of a circular treatment basin. The invention is therefore directed to a treatment plant in which it is possible, without reducing the overall efficiency of the water treatment operation, to deviated from the design of a circular treatment basin.

In a preferred arrangement of the present invention, the treatment plant includes a rectangular, and preferably an elongated basin having the mixing zone and the reaction zone located therein, and preferably centrally between the short transverse ends of the elongated basin. With a longitudinal basin it is possible, with suitable selection of dimensions, to provide, in all circumstances, an optimum utilization of available space. Moreover, a longitudinal basin will permit a substantial reduction in cost since it is more simple in its design and construction and in addition the equipment required for use with a rectangular basin will be substantially less than that required for a circular basin. In addition, with a longitudinal basin the possibility presents itself to construct and comb several juxtaposed basins concurrently.

As indicated, it is preferable that the basin be an elongated rectangle. However, if properly designed, it may even be square. Further, although the present invention is not limited to a basin of any specific size, excellent results have been obtained with basins having a width of between 2 and 8 meters and a length of between 12 and 30 meters.

The arrangement of the mixing chamber and the reaction chamber within the longitudinal basin can be determined in accordance with operating requirements. For example, it is possible to arrange the mixing chamber at one end of the longitudinal basin with the reaction chamber immediately adjacent it and wherein the remaining portion of the basin would serve as the sedimentation zone. Such an arrangement could be provided at one or both ends of the basin. It is particularly advantageous, to arrange the mixing chamber centrally with respect to the short end walls of the basin with the reaction chamber surrounding the mixing chamber. With this arrangement, the area longitudinally beyond the reaction chambers provide a long and relatively narrow area highly suitable for sedimentation. Further, for obtaining positive flow conditions it is advantageous that the width of the reaction chamber be less than the width of the basin itself. Using the above arrangement with the mixing chamber and the reaction chamber located centrally within the basin, there is provided between the outer walls of the reaction chamber and the end walls of the basin two sedimentation zones which are connected with each other around and under the reaction chamber.

Under certain operating conditions, it is preferable that the reaction chamber extend completely across the width of the longitudinal basin. This presents a very simple design since the side walls of the longitudinal basin itself may partially function as sidewalls of the reaction chamber thereby saving material. Indeed, the entire outer boundary of the reaction chamber can then be formed by simply providing a vertically extending baffle spaced from the mixing chamber and extending completely transversely across the longitudinal basin. Of course one such baffle may be provided on each longitudinal side of the mixing chamber.

According to another feature of the invention, the reaction chamber increases in cross-sectional area from the top downwardly thereby facilitating control of flow conditions through the reaction chambers. Thus, for example, if the reaction chamber is in fact formed by the sidewalls of the basin and a single baffle extending across the basin, then this baffle can be inclined downwardly toward the close end of the basin, thereby providing the said increased cross-sectional area from the top downwardly.

Preferably the plant in accordance with the present invention will include a suitable means for scraping sludge from the sedimentation zone into a sludge sump. In a preferred arrangement, the present invention includes a chain scraper arranged at the bottom of the sedimentation zone and extending across the width of the basin and movable longitudinally thereof for scraping sludge into a sump formed in the bottom central part of the basin. A chain scraper has the advantage that it requires no overhead suspension or carrying system. Thus, the entire upper area of the basin remains free for other apparatus. Moreover, the drive means for a chain scraper can be quite simple in comparison with that of a rotary scraping gear movable in a circular path in a circular basin. With this type of scraping apparatus, excellent scraping results can be obtained at scraping speeds of 1 to 2 centimeters per second.

As in the previous patent, the reaction chamber of the present invention includes an inner chamber and an outer chamber. Liquid from the inner chamber is returned to the bottom of the mixing chamber while substantially all water from the outer reaction chamber flows into the sedimentation zone in which the relatively large flocs are permitted to settle under relatively calm conditions.

In accordance with another feature of the present invention, the various walls including the walls of the mixing chamber, the outer walls of the reaction chamber, and the walls separating the inner and outer reaction chambers can all be suspended from an overhead carrier or beam extending transversely across the longitudinal basin, thereby considerably simplifying the overall construction of the apparatus. The said beam can be rigidly attached to the basin since no means are required for providing scraping gear at the top of the basin. If desired, however, this beam with the said walls extending downwardly therefrom can be designed to move longitudinally of the basin thereby permitting relocation of the said chambers. Of course the said beam may be omitted and the various walls may be formed directly connected to the basin itself.

In accordance with a further feature of the invention, open top discharge channels are located in the sedimentation zones such that the bottoms of the channels extend below the normal water line. Small openings in the channel below the water line then permit entry of clarified liquid into the channels, from which channels the liquid may be discharged as effluent from the basin. These channels, which may extend both longitudinally and transversely of the basin, may be made simply of tin plate or they may be made very strong, such as in concrete, and thus serve as additional supports for the basin.

In accordance with another feature of the invention, a chute of adjustable height may be provided above the level of the said channels for removing scum from the surface of the liquid in the sedimentation zones. Means may be provided for damming the normal effluent discharge openings thereby permitting the liquid therein to rise to a new higher level at which the water may be acted on by the scum removing means. In accordance with a feature of the invention, this scum discharge means may be an open top chute extending transversely across the channel and rotatable about its own longitudinal axis, thereby varying the height of the said open top of the chute, and hence varying the effective height of the scum removing means.

In accordance with another feature of the invention, the influent flow means may be constructed very simply. For example, it may simply be a pipe extending over a sidewall of the basin and directed downwardly to the bottom of the mixing chamber. This is possible because the upper portion of the plant need not be reserved for rotating scraping devices or the like.

Thus, it is an object of this invention to provide a new and improved water treatment plant which overcomes disadvantages of similar plants known heretofore.

It is another object of this invention to provide a new and improved water plant comprising a rectangular basin with a mixing chamber surrounded by a flocculation reaction chamber located therein.

It is another object of the present invention to provide a water treatment plant of the type described having a scraping means located at the bottom of the sedimentation zone and hence leaving the upper portion of the basin free for additional apparatus.

It is another object of this invention to provide a new and improved water treatment plant of the type described which retains the efficiency of previously known arrangements but which permits a vast saving in space.

It is another object of this invention to provide a new and improved water treatment plant of the type described having a new and improved adjustable height scum removing means above the sedimentation zone.

Other objects and the attendant advantages of the present invention will become apparent from the detailed description to follow together with the accompanying drawings.

BRIEF DESCRIPTION OF THE DRAWINGS

There follows a detailed description of the present invention which is to be read together with the accompanying drawings, the description and the drawings being provided only to illustrate a preferred embodiment of the invention.

FIG. 1 is a longitudinal sectional view of a longitudinal water treatment plant constructed in accordance with the features of the present invention.

FIG. 2 is a partial plan, partial sectional view taken along line 2–2 of FIG. 1.

FIG. 3 is a transverse vertical sectional view taken along line 3–3 of FIG. 1.

FIG. 4 is an enlarged view of a detail of FIG. 1.

DETAILED DESCRIPTION OF THE PREFERRED EMBODIMENT

Referring to the drawings, like elements represent like numerals throughout the several views.

The water treatment plant of the present invention includes a longitudinally extending basin 1 having a central preferably circular mixing chamber 2. Influent water to be treated is directed to the bottom of this mixing chamber from which it is directed upwardly gently by a single threaded spiral conveyor 4. From the upper end of the mixing chamber, the liquid flows outwardly through the flocculation reaction chamber 3 which includes an inner reaction chamber 5 and an outer reaction chamber 6. Outwardly longitudinally beyond the outer reaction chamber 6, on both longitudinal sides thereof, are the sedimentation zones 7. Although the present embodiment shows the chambers 2 and 3 in the center of the basin, it is to be understood that these elements can also be provided at any other location within the basin, for example adjacent one of the end walls thereof.

The operation of the elements 2 through 7 described above are basically the same as in the said previous patent. That is, waste water containing finely suspended mineral and organic solids or other pollutants are introduced at the bottom of the mixing chamber through which they are raised gently by the conveyor means, this gentle agitation causing the said suspended materials to aggregate or flocculate into larger masses which will subsequently settle out from the liquid. To enhance flocculation, it is also common to add flocculation agents such as electrically charged particles. The flocculation requires a certain reaction period which depends on the pHvalue of the water, the viscosity and the temperature. Moreover, flocculation is further encouraged by the return of already partially flocculated material from the inner reaction chamber 5 back to the bottom of the mixing chamber 2. Meanwhile, the liquid entering outer reaction chamber 6 flows out and into the sedimentation zone 7 which is kept relatively calm, thereby facilitating settlement of the large flocs under conditions which will not cause the said large flocs to be broken up.

The influent material is directed to the bottom of mixing chamber 2 through an influent inlet pipe 8 which passes over the sidewall of the basin and then through a vertical shaft 9 adjacent and in fact forming a sidewall of the mixing chamber and then through the lower opening 10 in the mixing chamber. The location of the pipe 8 over the top of the sidewall rather than through an opening in the lower portion of the wall is made possible by the overall design of the present invention wherein scraping means is provided along the bottom of the basin and does not require operating space along the top thereof.

As illustrated in FIG. 2, the inner reaction chamber 5 extends only part of the way across the width of basin 1 while the outer boundary 13 of the outer reaction chamber 6 extends completely across the basin. In this manner, the two sidewalls of the basin may be used as boundaries for the reaction zone together with the said plates 13. Two baffle plates 13 are shown in the illustrated embodiment. However, if the various chambers were provided at an end of the basin rather in the center thereof, then only a single baffle plate 13 would be required. Depending upon the capacity and the dimensions of the basin the outer reaction chamber 6 can also be designed such that it does not extend completely across the width of the basin. This presents the opportunity that the two sedimentation zone portions 7 of the two sides of the basin can be interconnected about the sides of the reaction chamber. Further, as shown in the views, the baffle plate 13 may be inclined downwardly and outwardly so that the outer reaction chamber 6 increases in cross-sectional area from the top downwardly in order to favorably influence flow conditions within the basin.

As is shown in FIG. 1, the basin may include a central sludge sump 11 and an outlet pipe 12 for removing sludge therefrom. MOreover, in accordance with a preferred feature of the invention, a means for scraping the bottom of the sedimentation zones are located at the bottom of said zones and do not include substantial structures located at or near the top of the basins. In this embodiment, the scraping means comprise chain conveyors 14, each of which includes a pair of opposed chains 15 having scrapers 16 extending across the basin from one chain 15 to the other. The chains are driven by a drive means 17. In addition, each chain may include a tension controlling device 18. In practice, as the sludge settles to the bottom of the sedimentation zone portions 7, each of the two chain conveyors 14 move to scrape the sludge into the sludge sump 11. It will be apparent that this scraping means is vastly simplified in comparison with previously known scraping arrangements. For example, there is no complicated suspension structure above the apparatus. Moreover, the top portion of the basin remains unencumbered and thus permits further advantageous design features such as the location of the inlet pipe 8, and other features to be described in greater detail below.

In accordance with a further feature of the invention, the basin may also include a crossbeam or platform 19 which may have affixed thereto all the various walls associated with the mixing chamber and the two reaction chambers. This will vastly simplify the overall construction of the plant because no supporting elements will be required to reach to the bottom of the basin. Also, if the baffle plates 13 are so designed, the crossbeam 19 can be omitted and the other plates may simply be connected to the baffle plate 13.

For discharging clarified water from the sedimentation zones, there are provided a plurality of transversely extending effluent channels 20 interconnected by longitudinally extending channels 21 which in turn deliver the clarified liquid into the effluent liquid outlet 22. These channels 20 and 21 are open top and include openings in the bottom thereof below the water line for the introduction of clarified liquid.

In order to keep the plant operating at top efficiency, it is also necessary to scrape sludge from the top of the liquid. For this purpose, the present invention includes a variable height scum removing device. Referring to FIGS. 1, 2 and 4, the present invention includes a scum chute 25 extending across the tank and including a mechanical device 26 for adjustably turning the chute 25 about its own axis. In this manner, it is possible to vary the height of the edge of the said chute 25. When it is desired to remove scum from the apparatus, the effluent outlet is first dammed, thereby causing the liquid to rise from its normal lever 23 (see FIG. 4) to its new raised position 24 (see FIG. 4). FIG. 4 also clearly illustrates the mechanical device 26 which may be operated from above and which is provided for turning the chute 25 about its axis. The scum collected in chutes 25 are then discharged from the plant through suitable laterally arranged scum discharge channels 27.

When the water surface is again clear, the dam is removed, the liquid returns to level 23, and clear effluent liquid again flows through effluent discharge outlet 22.

To summarize, there is provided an arrangement wherein operating efficiency is not reduced but wherein vast savings may be made in terms of space requirements. For example, a plurality of the basins shown in FIGS. 1 through 4 may be arranged side by side, thereby providing an overall efficiency per unit of floor space far excelling anything possible with the conventional circular basins.

Although the invention has been described in considerable detail with respect to preferred embodiments thereof, it will be apparent to those skilled in the art that numerous modifications and variations are possible within the spirit and scope of the invention.

I claim:

1. A treatment plant for treating waste water by flocculating and settling pollutants in the water, comprising, a rectangular basin, a mixing chamber in said basin, means for introducing influent water to be treated into said mixing chamber and agitating means for causing at least slight agitation of the influent water in said mixing chamber, a flocculation reaction chamber in said basin adjacent said mixing chamber, means for permitting water to flow from said mixing chamber to said reaction chamber, wherein flocculation takes place, and means for returning at least some water from the reaction chamber back to said mixing chamber to encourage flocculation of new influent waste water being introduced into the mixing chamber, and a sedimentation zone constituted by a space formed between the reaction chamber and the walls of the said basin, whereby solid pollutants settle in said sedimentation zone, means for permitting most of the water in the reaction chamber to pass into the sedimentation zone, and wherein the walls of the basin and hence the sides of the sedimentation zone other than the side thereof adjacent the reaction chamber are substantially straight, adjacent ones of said other walls being generally perpendicular to each other.

2. A waste treatment plant according to claim 1, wherein said basin is elongated, having a pair of opposed longitudinal sidewalls and a pair of shorter transverse end walls.

3. A waste treatment plant according to claim 2, wherein said mixing chamber and said reaction chamber are located in the longitudinal basin centrally with respect to the two said end walls, and said sedimentation zone comprises two portions, one portion located between the reaction chamber and each end wall of the basin.

4. A waste treatment plant according to claim 2, wherein the reaction chamber surrounds the said mixing chamber and wherein the largest dimension of the reaction chamber in the transverse direction of the basin is less than the width of the basin between the said sidewalls.

5. A waste treatment plant according to claim 2, wherein the reaction chamber surrounds the mixing chamber and wherein the reaction chamber extends for the full transverse width of the basin.

6. A waste treatment plant according to claim 2, wherein the reaction chamber is bounded on the side thereof spaced away from the mixing chamber in the longitudinal direction of the basin by at least one generally vertical baffle plate extending transversely across the basin.

7. A waste treatment plant according to claim 6, wherein the mixing chamber and the reaction chamber are located in the center of the basin with the reaction chamber surrounding the mixing chamber, and including two of said baffle plates, one at each longitudinal end of the reaction chamber.

8. A waste treatment plant according to claim 2, wherein said agitating means comprises a spiral auger conveyor for gently lifting the influent material located in the mixing chamber and wherein said flocculating reaction chamber surrounds the mixing chamber and includes an inner reaction chamber and an outer reaction chamber, the sedimentation zone located outward of said outer reaction chamber, wherein influent material passing downwardly through the inner reaction chamber partly flocculates and reenters the mixing chamber at the bottom thereof to promote flocculation therein, and wherein water in the outer reaction chamber further flocculates, most of said water in the outer reaction chamber passing to said sedimentation zone.

9. A waste treatment plant according to claim 8, wherein the sedimentation zone comprises two portions, one between the outer reaction zone and each of said basin end walls, and wherein the said two portions are in fluid communication with each other beneath the said reaction chamber and the said mixing chamber.

10. A waste treatment plant according to claim 2, wherein the reaction chamber increases in cross-sectional area from the top thereof downwardly.

11. A waste treatment plant according to claim 2, including a sludge sump in the bottom of the basin, and including a sludge scraper device located on the bottom of the basin and movable longitudinally thereof for scraping settled sludge waste material into the sludge sump.

12. A waste treatment plant according to claim 11, wherein said scraping device is a chain scraper and includes a pair of chains on opposite sides of the basin and sludge scraping elements connected to and extending between the chains for movement upon movement of the chains.

13. A waste treatment plant according to claim 2, including wall members defining said reaction chamber and said mixing chamber, said wall members being suspended on a beam extending transversely across and located above the basin.

14. A waste treatment plant according to claim 2, including discharge means arranged above the normal level of the liquid in the sedimentation zone for receiving liquid and discharging it from the basin, said discharge means comprising a plurality of transverse channels extending transversely across the basin and at least one connecting channel extending longitudinally and connecting said transverse channels to an outlet.

15. A waste treatment plant according to claim 14, wherein said channels have an open top and smaller openings below the said normal level of the water for the passage of water into said channels.

16. A waste treatment plant according to claim 14, including a scum removal means above the level of the said channels for removing floating scum material from the surface of the liquid in the basin, such scum removal means comprising at least one chute located above the said normal liquid level and adjusting means for adjusting the edge of the chute.

17. A waste treatment plant according to claim 16, wherein said chute extends transversely across the basin, and wherein said adjusting means comprises means for swinging the said chute about its axis.

18. A waste treatment plant according to claim 2, including means for introducing incoming influent water into the bottom of said mixing chamber and comprising a vertical pipe forming one wall of the mixing chamber and leading from the top of the basin to the bottom of the mixing chamber.